Patented Oct. 21, 1924.

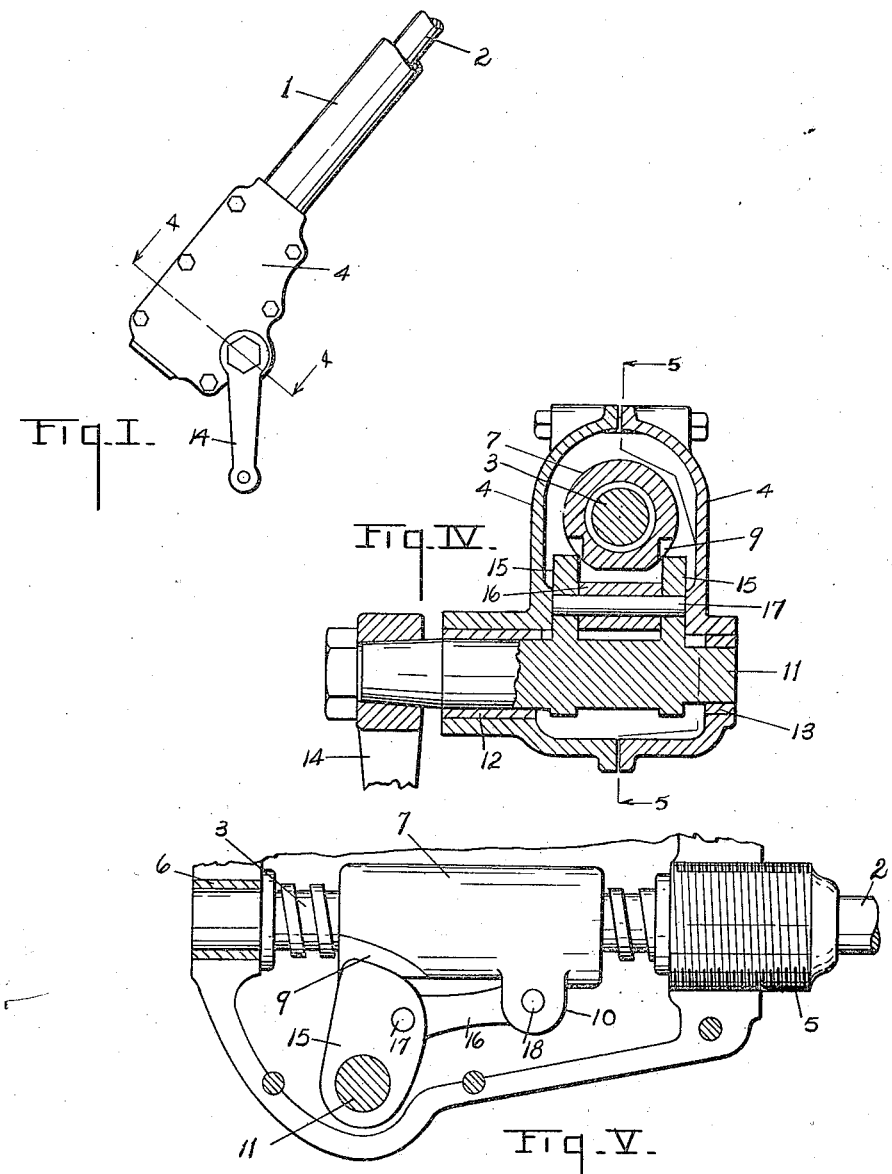

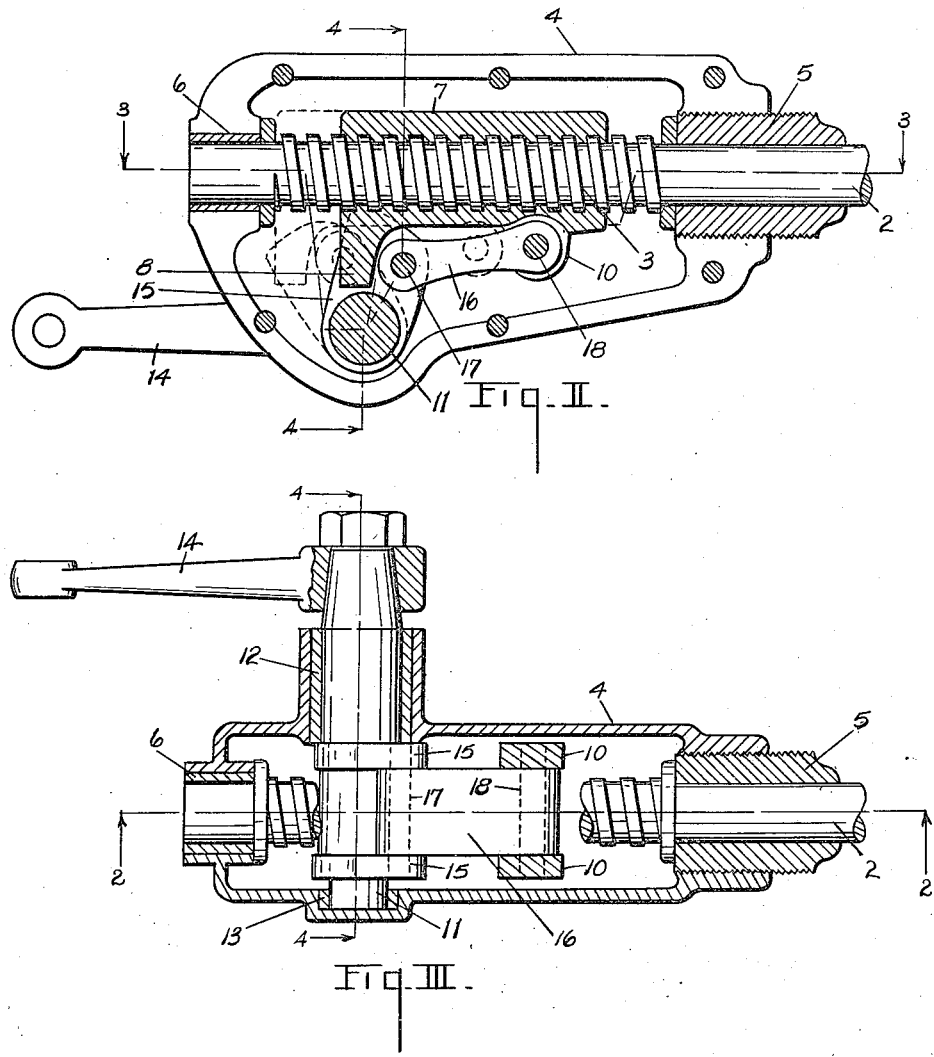

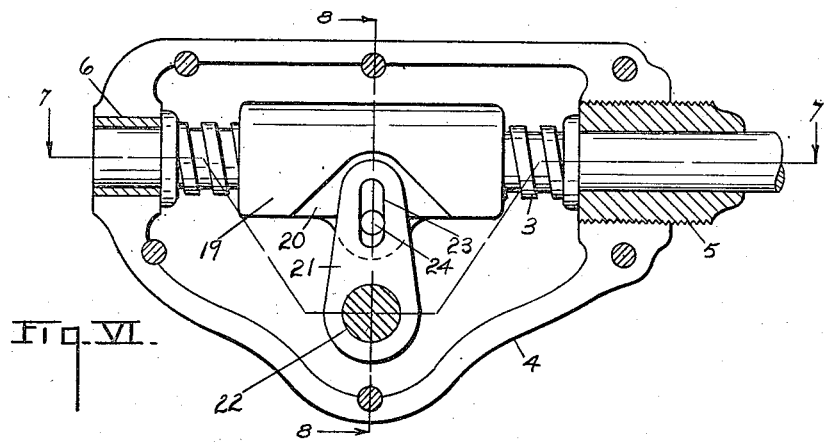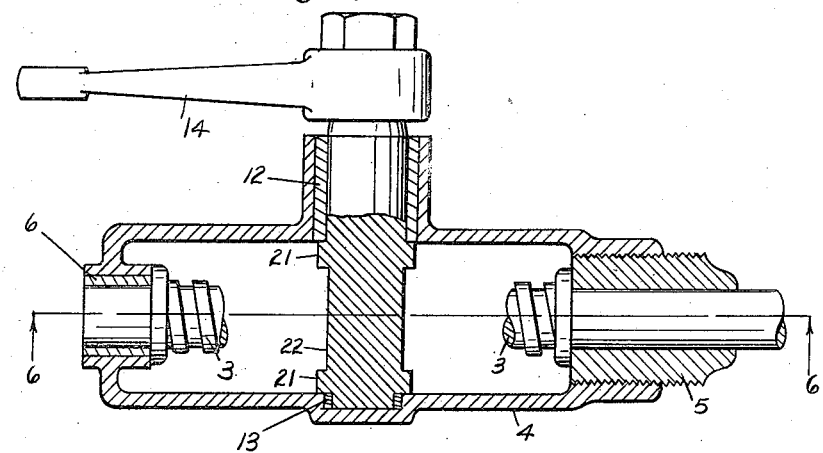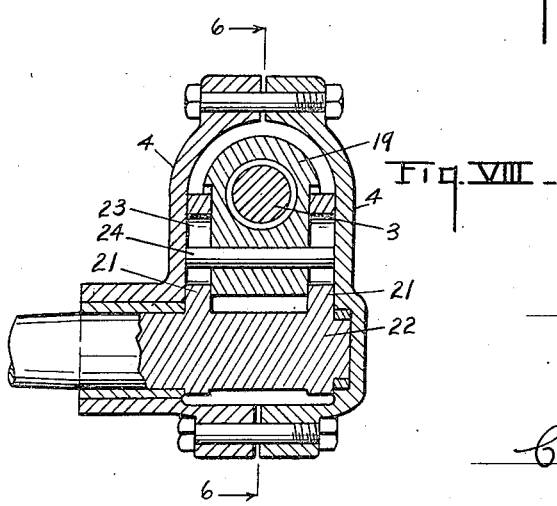

1,512,424

UNITED STATES PATENT OFFICE.

DAVID W. JONES, OF CHICAGO, ILLINOIS, ASSIGNOR TO CHARLES A. BAILEY AND GEORGE D. BAILEY, BOTH OF KALAMAZOO, MICHIGAN.

VEHICLE STEERING GEAR.

Application filed January 2, 1923. Serial No. 610,280.

*To all whom it may concern:*

Be it known that I, DAVID W. JONES, a citizen of the United States, residing at Chicago, county of Cook, State of Illinois, have invented certain new and useful Improvements in Vehicle Steering Gears, of which the following is a specification.

This invention relates to improvements in vehicle steering gear.

The main objects of this invention are to provide a simple mechanism by means of which the rotary motion of the steering column may be transmitted to the rocker member which is in turn connected to the steering wheels.

A further object is to provide a mechanism of this character which is very simple and economical in structure and at the same time strong and durable in use.

Objects pertaining to details and economies of construction and operation will definitely appear from the detailed description to follow.

I accomplish the objects of my invention by the devices and means described in the following specification. The invention is clearly defined and pointed out in the claims.

A structure which is a preferred embodiment of the invention is clearly illustrated in the accompanying drawing forming a part of this application, in which:

Fig. I is a side elevation of the lower end of a steering column embodying the features of my invention.

Fig. II is a detail vertical section on a line corresponding to line 2—2 of Fig. III, portions being shown in full lines for convenience in illustration.

Fig. III is a detail view partially in section on a line corresponding to line 3—3 of Fig. II.

Fig. IV is a transverse section on a line corresponding to line 4—4 of Figs. I, II and III, parts being shown in full lines for convenience in illustration.

Fig. V is a fragmentary view partially in section on the broken line 5—5 of Fig. IV.

Fig. VI is a detail view partially in longitudinal section on a line corresponding to line 6—6 of Figs. VII and VIII of a modified form or embodiment of my invention.

Fig. VII is a fragmentary view partially in section on a line 7—7 of Fig. VI.

Fig. VIII is a transverse section on a line corresponding to line 8—8 of Fig. VI, parts being shown in full lines for convenience in illustration.

In the drawings the sectional views are taken looking in the direction of the little arrows at the ends of the section lines and similar numerals of reference refer to similar parts throughout the several views.

Referring to the drawing, 1 represents the steering post column, 2 the steering post or shaft which is provided with a screw 3 at its lower end. The lower end of this shaft 2 is supported in the housing 4 which is provided with suitable bearings 5 and 6. On this steering screw is an elongated nut 7 provided in the embodiment shown in Figs. I to V, inclusive, with a depending portion 8 at its rear end having flattened parallel sides 9. The nut is provided at its front end with spaced depending ears 10.

The rocker shaft or rocker member 11 is disposed transversely of the actuating screw 3 which is supported in bearings 12 and 13 in the casing 4. The rocker member is provided with an arm 14 which is connected by means of a suitable link mechanism or otherwise to the steering wheel. The rocker member is provided with a pair of spaced arms 15 which embrace the flattened sides 9 of the nut, thereby supporting it against rotation on the screw.

In the embodiment shown in Figs. I to V inclusive the arms are connected to the nut by means of a link 16 which is pivoted between the arms at 17 and between the ears 10 at 18, so that the rocker member is actuated through the nut as the nut is reciprocated by the actuating screw on the steering shaft.

This forms a very compact device and one which is very economical to produce and at the same time it is strong and durable.

In the embodiment shown in Figs. VI to VIII inclusive the nut 19 has flattened side portions 20 disposed centrally thereof while the arms 21 on the rocker member 22 embrace these flattened portions preventing the rotation of the nut substantially as in the embodiment previously described. The link connection, however, is omitted, the arms being provided with longitudinal slots 23 engaging the pin 24 on the nut, whereby the movement of the nut imparts motion to the rocker member.

This embodiment is even more simple in its parts than the embodiment shown in Figs. I to V inclusive, but there is an element of greater friction. However, this embodiment is a very satisfactory one.

My improved steering gear is strong and durable and at the same time the parts are very economical to produce and assemble. I have not attempted to illustrate or describe certain other modifications and structural details which I contemplate as I believe the disclosure made will enable those skilled in the art to which my invention relates to embody or adapt the same as may be desired.

Having thus described my invention what I claim as new and desire to secure by Letters Patent is:

1. In a vehicle steering gear, the combination of a casing, a steering screw journaled therein, a rocker shaft journaled in said casing transversely of said screw, an elongated nut on said screw provided with a depending part having parallel sides at one end and a pair of spaced ears at its other end, arms on said rocker member embracing the said parallel sides of said depending part of said nut whereby it is supported against rotation, and a link pivoted between said arms and said ears whereby the rocker shaft is actuated through said nut.

2. In a vehicle steering gear, the combination of a casing, a steering screw journaled therein, a rocker shaft journaled in said casing transversely of said screw, an elongated nut on said screw provided with a part having parallel sides, arms on said rocker member embracing the said parallel sides of said nut whereby it is supported against rotation, and a link connecting said arms to said nut whereby the rocker shaft is actuated through said nut.

3. In a vehicle steering gear, the combination with an actuating screw, a nut on said screw provided with flattened side portions, a rocker member provided with arms embracing said flattened side portions whereby the nut is supported against rotation, and a link connecting said nut to said arms whereby the rocker member is actuated through said nut.

In witness whereof, I have hereunto set my hand and seal.

DAVID W. JONES. [L. S.]